United States Patent
Yasunori (10) Patent No.: US 10,960,835 B2
(45) Date of Patent: Mar. 30, 2021

(54) IN-VEHICLE POWER SUPPLY APPARATUS AND CONTROL METHOD FOR THE SAME

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventor: Hiromichi Yasunori, Mie (JP)

(73) Assignees: AutoNetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 359 days.

(21) Appl. No.: 15/762,352

(22) PCT Filed: Sep. 7, 2016

(86) PCT No.: PCT/JP2016/076243
§ 371 (c)(1),
(2) Date: Mar. 22, 2018

(87) PCT Pub. No.: WO2017/051708
PCT Pub. Date: Mar. 30, 2017

(65) Prior Publication Data
US 2018/0272968 A1 Sep. 27, 2018

(30) Foreign Application Priority Data
Sep. 25, 2015 (JP) .............. JP2015-187742

(51) Int. Cl.
*B60R 16/033* (2006.01)
*H02J 7/00* (2006.01)
(Continued)

(52) U.S. Cl.
CPC .......... *B60R 16/033* (2013.01); *H02J 7/0029* (2013.01); *H02J 7/0031* (2013.01);
(Continued)

(58) Field of Classification Search
USPC .................................... 307/9.1, 10.1
See application file for complete search history.

(56) References Cited

U.S. PATENT DOCUMENTS

2013/0249219 A1* 9/2013 Kim .............. F02N 11/04
290/36 R

FOREIGN PATENT DOCUMENTS

| JP | 2012-130108 A | | 7/2012 |
| JP | WO2013035238 | * | 3/2013 |
| JP | 2015-076959 A | | 4/2015 |

OTHER PUBLICATIONS

Search Report for PCT/JP2016/076243, dated Nov. 15, 2016.

* cited by examiner

*Primary Examiner* — Rexford N Barnie
*Assistant Examiner* — Xuan Ly
(74) *Attorney, Agent, or Firm* — Honigman LLP (57) ABSTRACT

An in-vehicle power supply apparatus supplies power to an external load while bypassing the occurrence of an overcurrent, even when there is a failure on a main battery side or a failure on a sub-battery side includes a main battery and a sub-battery and two relays. One of the relays is connected to the main battery via the other relay, and transitions from a closed to an open state when an overcurrent flows thereto after the other relay transitions from the closed state to the open state. The other relay transitions from the closed state to the open state when an overcurrent flows thereto. The sub-battery is connected to the main battery via both of the relays. The main battery is connected to a backup load, bypassing both of the relays. A sub-power supply path connects the sub-battery and the backup load via the one relay.

10 Claims, 8 Drawing Sheets (51) Int. Cl.
*H02J 7/14* (2006.01)
*H02J 1/10* (2006.01)
*H02H 3/087* (2006.01)

(52) U.S. Cl.
CPC .......... *H02J 7/0063* (2013.01); *H02J 7/1423* (2013.01); *H02H 3/087* (2013.01); *H02J 1/108* (2013.01); *H02J 7/00304* (2020.01); *H02J 2007/0067* (2013.01)

IN-VEHICLE POWER SUPPLY APPARATUS AND CONTROL METHOD FOR THE SAME

CROSS-REFERENCE TO RELATED APPLICATIONS

This application is the U.S. national stage of PCT/JP2016/076243 filed Sep. 7, 2016, which claims priority of Japanese Patent Application No. JP 2015-187742 filed Sep. 25, 2015.

TECHNICAL FIELD

This invention relates to an in-vehicle power supply apparatus.

BACKGROUND

In recent years, advances have been made in the electrification of vehicle loads. There are loads that receive power supply and are driven, even in the case where the engine has stopped in order to idle stop (provisionally referred to hereinafter as "at the time of ignition off"). These loads will hereinafter be referred to as idling stop loads (in the drawings, displayed as "IS load"). Navigation apparatuses and audio apparatuses are given as examples of idling stop loads.

Figure 15:
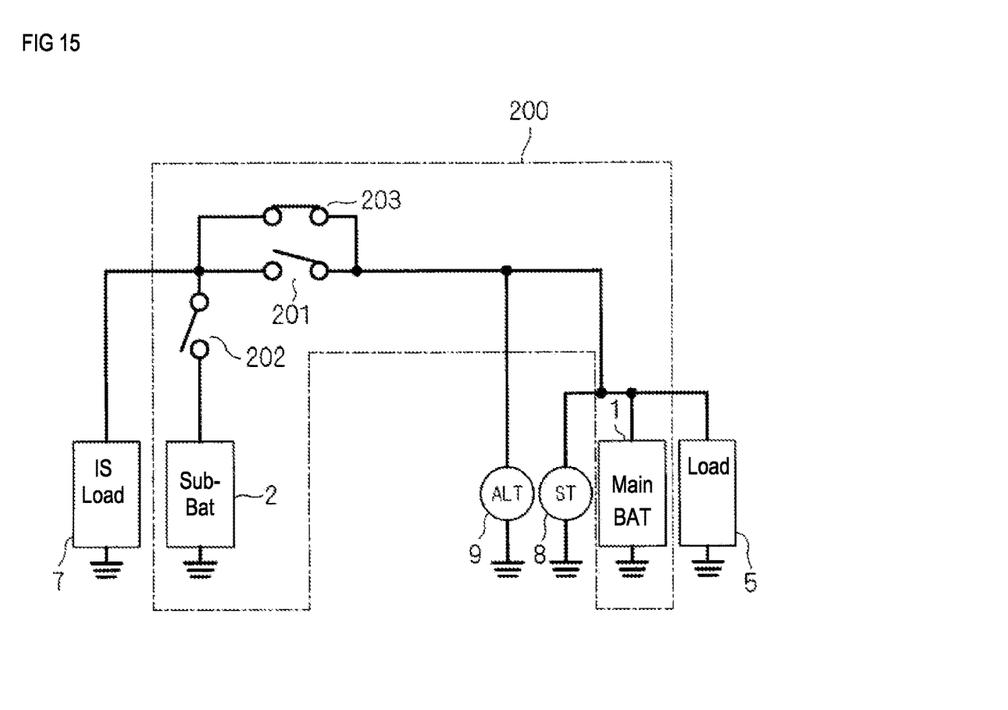
FIG. 15 is a circuit diagram showing a conventional technology.

FIG. 15 is a circuit diagram showing the configuration of a battery system in which an in-vehicle power supply apparatus 200 supplies power to an idling stop load 7, in addition to a general load 5. The in-vehicle power supply apparatus 200 is provided with a main battery (in the drawings, denoted as "Main BAT") 1, a sub-battery (in the drawings, denoted as "Sub-BAT") 2, and relays 201, 202 and 203. The relays 201 and 203 are connected in parallel. The load 5 is connected to the main battery 1 without passing via the relays 201, 202 and 203.

When the ignition is turned on and a starter 8 is driven, the main battery 1 is charged by a power generation function of an alternator 9. The sub-battery 2 is connected to the main battery 1 via the relays 201, 202 and 203. The idling stop load 7 is respectively connected to the main battery 1 via the relays 201 and 203 and to the sub-battery 2 via the relay 202.

If the relays 201 and 202 are normally open relays and the relay 203 is a normally closed relay, power is supplied to the idling stop load 7 from the main battery 1 via the relay 203, even when a control apparatus (not illustrated) that controls the relays 201, 202 and 203 fails. Such a technology is introduced in the following JP 2012-130108A.

The case where a failure, such as ground fault, for example, occurs closer to the main battery 1 that is the relay 201 is envisaged. Normally, when an overcurrent is detected, the relays 201 and 202 are controlled to transition from a closed state to an open state in order to cut off this overcurrent. Therefore, in the case where it is envisaged as described above, the overcurrent starts flowing from the sub-battery 2 via the relays 201, 202 and 203, and the relay 202 enters the open state.

If the relay 202 thus enters the open state, power supply from the sub-battery 2 to the idling stop load 7 will stop. Because the failure has occurred on the main battery 1 side, power is effectively not supplied to the idling stop load 7, even when the relay 203 is closed at this time.

There are also electrified loads that perform functions relating to travelling, steering, and stopping. Therefore, it should be possible to avoid loss of the battery function (including malfunction thereof; this similarly applies below). From this viewpoint, it is also desirable to adopt a sub-battery as a backup power supply.

In view of this, an object of the present invention is to provide a technology for supplying power to an external load while avoiding the occurrence of an overcurrent, even in the case where a failure on the main battery side or a failure on the sub-battery side has occurred.

SUMMARY

An in-vehicle power supply apparatus is provided with a main battery and a sub-battery that are both for in-vehicle use, a first switch and a second switch, and a main power supply path and a sub-power supply path. The second switch is connected to the main battery via the first switch. The sub-battery is connected to the main battery via the first switch and the second switch. The main power supply path connects the main battery to a load, bypassing the first switch and the second switch. The sub-power supply path connects the sub-battery to the load via the second switch. The first switch transitions from on to off when an overcurrent flows thereto. The second switch transitions from on to off when an overcurrent flows thereto after the first switch transitions from on to off.

Advantageous Effects of Invention

An in-vehicle power supply apparatus supplies power externally while avoiding the occurrence of an overcurrent, even in the case where a failure on the main battery side or a failure on the sub-battery side has occurred.

DETAILED DESCRIPTION OF PREFERRED EMBODIMENTS

Figure 1:
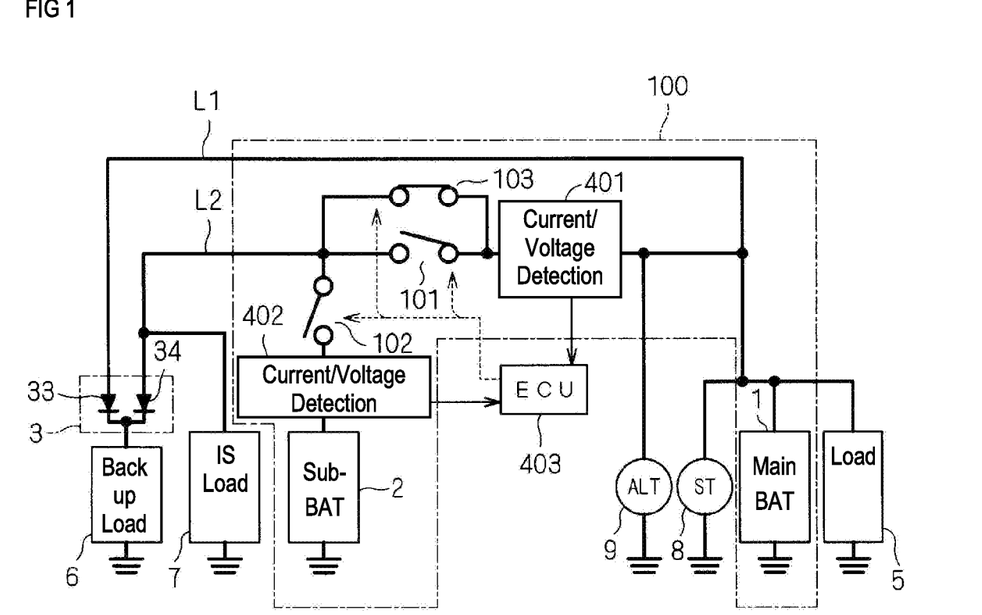
FIG. 1 is a circuit diagram showing an in-vehicle power supply apparatus according to an embodiment.

FIG. 1 is a circuit diagram showing an in-vehicle power supply apparatus 100 according to an embodiment and elements connected thereto. The in-vehicle power supply apparatus 100 is provided with a main battery 1, a sub-battery 2, relays 101, 102 and 103, and circuits 401 and 402 that perform detection of current and voltage (in the drawings, both written as "current/voltage detection"). The open state/closed state of the relays 101, 102 and 103 is controlled by an in-vehicle ECU (Engine Control Unit) 403. For example, the in-vehicle ECU 403 transitions the relays 101, 102 and 103 between the open state and the closed state, in the case where an overvoltage or an overcurrent is detected in the circuits 401 and 402.

The main battery 1 and the sub-battery 2 are both for in-vehicle use, and the relay 101 and 102 are connected in series between both batteries. The relay 101 is connected to the main battery 1 via the circuit 401, and the relay 102 is connected to the main battery 1 via the relay 101 and the circuit 401. The relays 101 and 103 are connected in parallel. It is possible to comprehend the relays 101, 102 and 103 respectively as a first switch, a second switch and a third switch in which the closed state/open state corresponds to on/off.

The main battery 1 is charged from outside the in-vehicle power supply apparatus 100. Specifically, the main battery 1 is connected to the alternator 9 which is mounted in the vehicle, and is charged by a power generation function of the alternator 9. The sub-battery 2 is charged by at least one of the alternator 9 and the main battery 1.

A lead storage battery, for example, is adopted for the main battery 1, and a lithium ion battery, for example, is adopted for the sub-battery 2. The main battery 1 and the sub-battery 2 are both concepts that include a capacitor, and an electric double-layer capacitor can also be adopted for the sub-battery 2, for example.

The starter 8 together with the general load 5 is connected to the main battery 1 from outside the in-vehicle power supply apparatus 100. The load 5 is a load that is not for backing up by the sub-battery 2, and is an in-vehicle air conditioner, for example. The starter 8 is a motor that starts an engine which is not shown. Because the load 5 and the starter 8 are well-known loads and do not have characteristic features in the embodiment, a detailed description thereof is omitted.

A backup load 6 is a load to which supply of power is desirably maintained even when power supply from the main battery 1 is lost, and a shift-by-wire actuator and an electronic brake force distribution system can be given as examples.

The in-vehicle power supply apparatus 100 is further provided with a main power supply path L1 and a sub-power supply path L2, and supplies power to the backup load 6 via these paths. The main power supply path L1 is connected in parallel to the main battery 1, the load 5 and the backup load 6, between fixed potential points (here, ground). That is, the load 5 and the backup load 6 both receive power via the main power supply path L1.

The main power supply path L1 connects the main battery 1 and the backup load 6 without passing via (i.e., bypassing) the relays 101, 102 and 103. The sub-power supply path L2 is connected to the sub-battery 2 via the relay 102 and the circuit 402. Accordingly, the backup load 6 can receive power not only from the main battery 1 but also from the sub-battery 2.

A diode group 3 is interposed between the backup load 6 and the main power supply path L1 and sub-power supply path L2. The diode group 3 prevents sneak current between the main battery 1 and the sub-battery 2 via the main power supply path L1 and the sub-power supply path L2. This sneak current causes degradation of one or both of the main battery 1 and the sub-battery 2.

Here, the case where both the main battery 1 and the sub-battery 2 supply power to the backup load 6 at a higher potential than ground is envisaged. The cathodes of a pair of diodes 33 and 34 that constitute the diode group 3 are connected in common, and are connected to the backup load 6. The anode of the diode 33 is connected to the main power supply path L1, and the anode of the diode 34 is connected to the sub-power supply path L2.

Because the diodes 33 and 34 are thus connected such that the forward directions are opposed, the abovementioned sneak current is prevented. Moreover, power supply to the backup load 6 is possible from the main power supply path L1 via the diode 33 and from the sub-power supply path L2 via the diode 34.

The idling stop load 7 is connected to the sub-power supply path L2, and is connected to the sub-battery 2 via the relay 102 and the circuit 402. Also, the idling stop load 7 is connected to the main battery 1 via the relays 101 and 103 and the circuit 401. That is, if the circuits 401 and 402 are excluded from consideration, the connection relationship of the idling stop load 7 with the relays 101, 102 and 103 and with the main battery 1 and the sub-battery 2 in the present embodiment is similar to the connection relationship of the idling stop load 7 with the relays 201, 202 and 203 and with the main battery 1 and the sub-battery 2 shown in FIG. 15.

The circuit 401 and the circuit 402 respectively detect the voltage (hereinafter, referred to as "main voltage") of the main battery 1 and the voltage (hereinafter, referred to as "sub-voltage") of the sub-battery 2. In the case where an overcurrent, which will be discussed later, has not occurred, the in-vehicle ECU 403 sets the open state/closed state of the relays 101, 102 and 103 as follows.

If the sub-voltage is low enough that it is judged that the sub-battery 2 needs to be charged, the relays 101 and 102 are both set to the closed state, and the sub-battery 2 is charged with the main battery 1 and/or the alternator 9. If the sub-voltage is high enough that it is judged that charging of the sub-battery 2 is excessive, the relays 101 and 103 are set to the open state and charging of the sub-battery 2 is stopped. At this time, if the relay 102 is set to the closed state, power is supplied to the backup load 6 from the main power supply path L1 or the sub-power supply path L2, depending on the magnitude relationship between the main voltage and the sub-voltage.

When the sub-battery 2 is not charged, the closed state/open state of the relay 102 is selected, according to the operation. In the present embodiment, such selection of the closed state/open state of the relay 102 when not charging the sub-battery 2 is not essential at the time of normal operation. Therefore, a detailed description regarding this selection is omitted.

The circuit 401 detects the current (hereinafter, referred to as "first current") that flows to the parallel connection of the relays 101 and 103. If it is judged that the first current is an overcurrent, the in-vehicle ECU 403 sets the relays 101 and 103 to the open state, even at the time of charging the sub-battery 2. The circuit 402 detects the current (hereinafter, referred to as "second current") that flows to the relay 102. If it is judged that the second current is an overcurrent, the in-vehicle ECU 403 sets the relay 102 to the open state, even at the time of charging the sub-battery 2.

Operation Principle

Hereinafter, in order to avoid complexity in the drawings, circuit diagrams that omit the circuits 401 and 402 and the in-vehicle ECU 403 from FIG. 1 are used in FIGS. 2 to 8, in describing the operation principle of the present embodiment.

Figure 2:
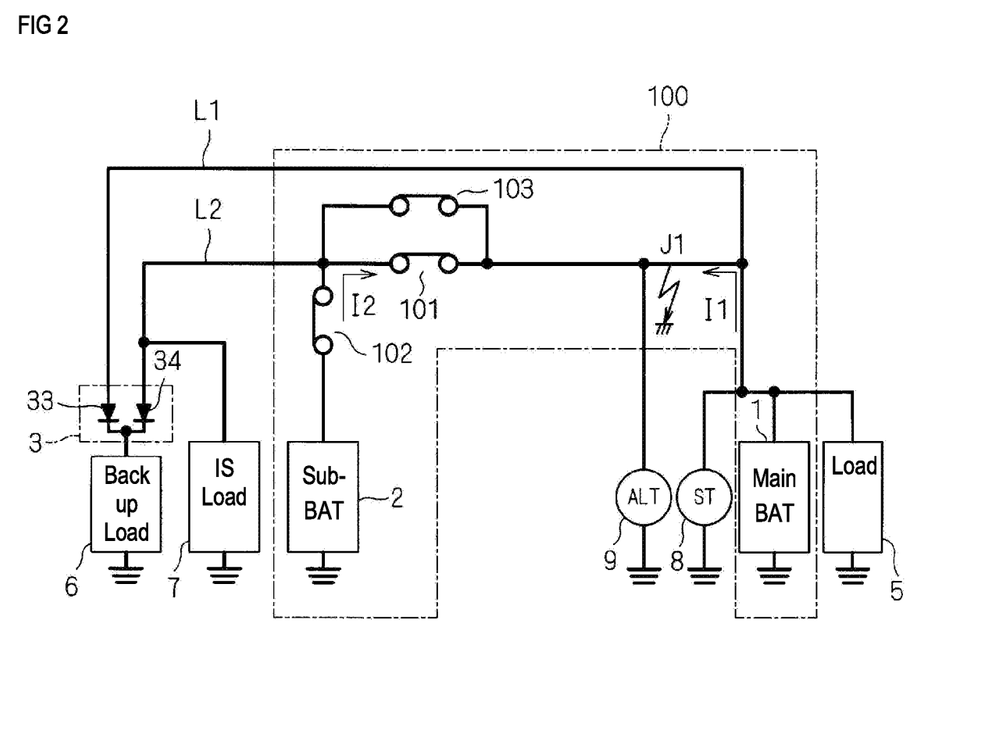
FIG. 2 is a circuit diagram showing the in-vehicle power supply apparatus according to the embodiment.

FIG. 2 is a circuit diagram showing a situation in which a ground fault J1 has occurred closer to the main battery 1 than are the relays 101 and 103 (than is the circuit 401, more precisely), when the relays 101, 102 and 103 are in the closed state. Due to the ground fault J1, a current I2 also flows to ground from the sub-battery 2 via the relays 101, 102 and 103, in addition to a current I1 flowing to ground from the main battery 1. This similarly applies in the case where a ground fault occurs on the main power supply path L1. The current I2 is a ground fault current and flows not only as the second current but also as the first current. Therefore, the circuits 401 and 402 detect both the first current and the second current as overcurrents.

In such a state, both the main battery 1 and the sub-battery 2 will be short circuited by the ground fault J1, and power cannot be supplied from either the main power supply path L1 or the sub-power supply path L2. However, if the relays 101, 102 and 103 are all set to the open state, power supply from the sub-power supply path L2 will no longer be performed continuously.

Figure 3:
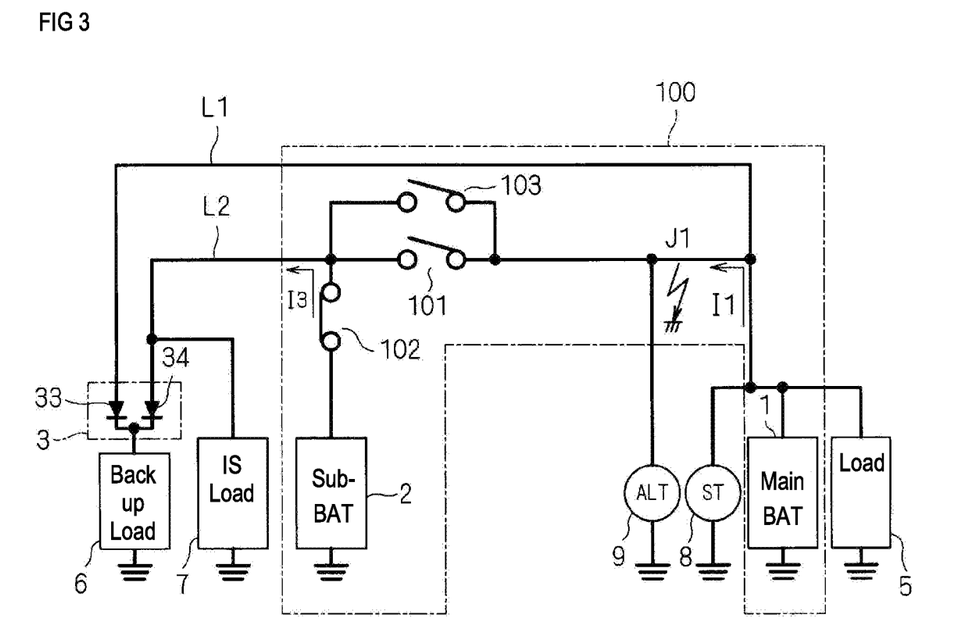
FIG. 3 is a circuit diagram showing the in-vehicle power supply apparatus according to the embodiment.

In the present embodiment, in the case where such an overcurrent is detected, the relays 101 and 103 transitions from the closed state to the open state while the relay 102 remains in the closed state. As a result of the function of the diode group 3, the sub-battery 2 is thereby cut off from the ground fault J1 as shown in FIG. 3, and the current I2 which is a ground fault current does not flow. Instead, a current I3 flows from the sub-battery 2 to the sub-power supply path L2. Because the current I3 is not a ground fault current, the circuit 402 does not judge that the second current is an overcurrent, and accordingly the relay 102 maintains the closed state.

Therefore, power is supplied to the backup load 6 and the idling stop load 7 from the sub-power supply path L2 by the current I3. That is, the sub-battery 2 functions as a backup power supply for the backup load 6. Even in the case where a failure thus occurs on the main battery 1 side, supply of power externally is secured while avoiding the occurrence of an overcurrent.

Note that once the relays 101 and 103 have been set to the open state as a result of an overcurrent being detected as the first current, the relays 101 and 103 are not transitioned to the closed state even when an overcurrent is not detected for the first current. This is to ensure that the current I2 does not flow as a ground fault current again.

Figure 4:
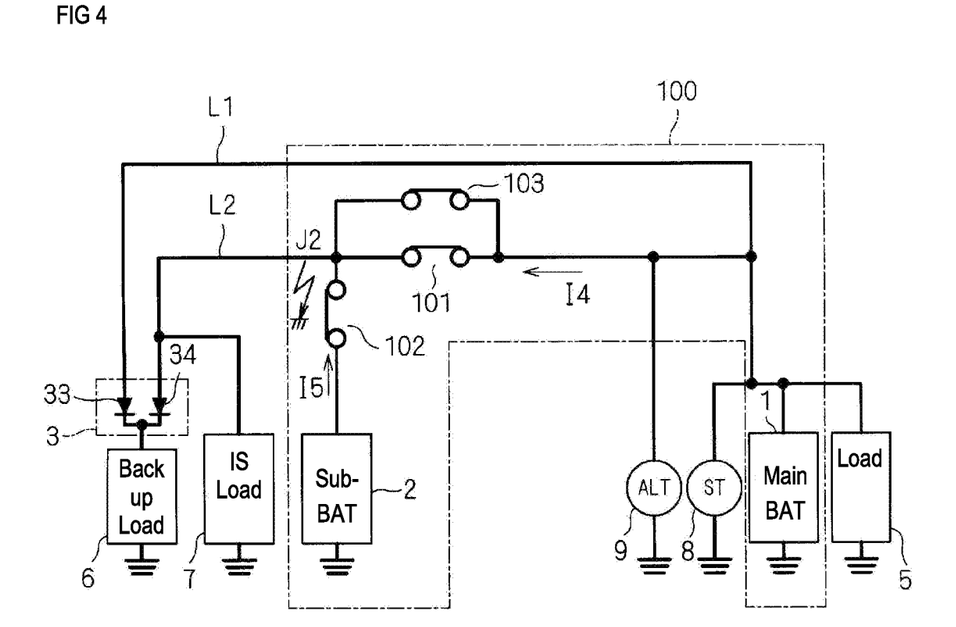
FIG. 4 is a circuit diagram showing the in-vehicle power supply apparatus according to the embodiment.

FIG. 4 is a circuit diagram showing a situation in which a ground fault J2 has occurred on the opposite side to the main battery 1 and the sub-battery 2 with respect to the relays 101, 102 and 103, or in other words, on the sub-power supply path L2, when the relays 101, 102 and 103 are in the closed state. The ground fault J2 causes a current I4 and a current I5 to respectively flow to ground from the main battery 1 via the relays 101 and 103 and from the sub-battery 2 via the relay 102. The currents I4 and I5 are ground fault currents, and respectively flow as the first current and the second current. Therefore, the circuits 401 and 402 detect both the first current and the second current as overcurrents.

Figure 5:
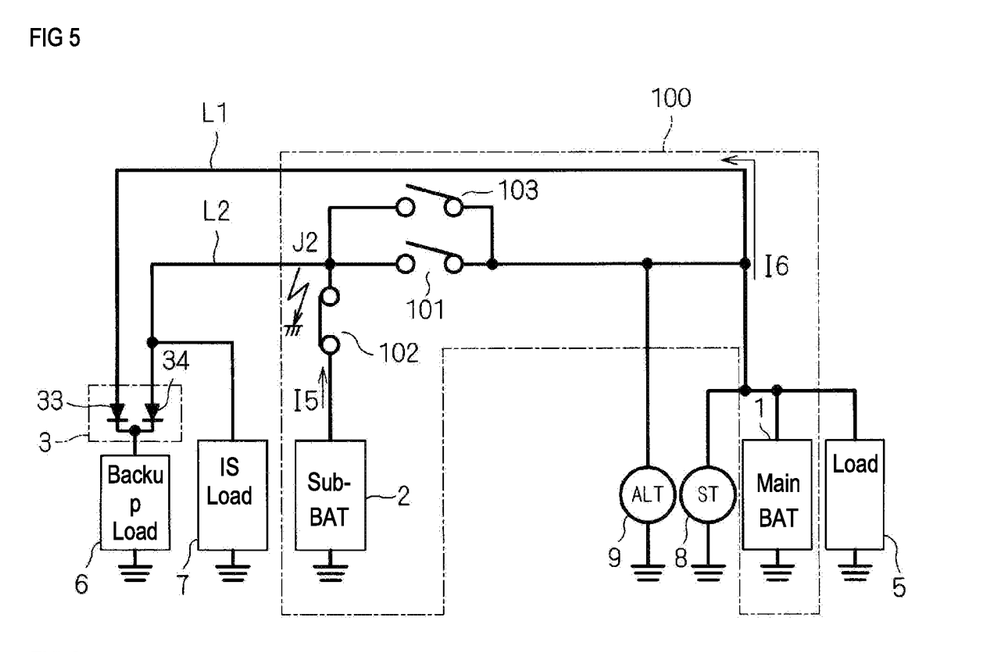
FIG. 5 is a circuit diagram showing the in-vehicle power supply apparatus according to the embodiment.

As described above, in the present embodiment, the relays 101 and 103 transition from the closed state to the open state while the relay 102 remains in the closed state, in the case where such an overcurrent is detected. As a result of the function of the diode group 3, the main battery 1 is thereby cut off from the ground fault J2 as shown in FIG. 5, and a current I6 flows to the main power supply path L1.

Therefore, power is supplied to the backup load 6 from the main power supply path L1 by the current I6. That is, the main battery 1 functions as a backup power supply for the backup load 6. Even in the case where a failure occurs on the sub-battery 2 side in this manner, supply of power externally is secured while avoiding the occurrence of an overcurrent.

Figure 6:
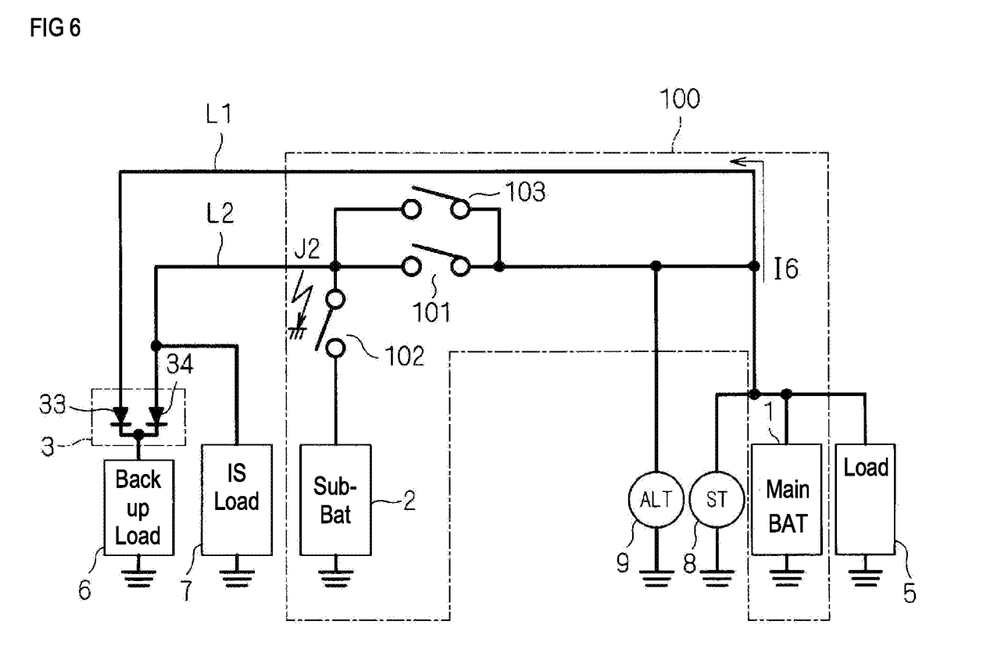
FIG. 6 is a circuit diagram showing the in-vehicle power supply apparatus according to the embodiment.

Because the current I5 flows from the sub-battery 2 via the relay 102, the circuit 402 detects the second current as an overcurrent. The relay 102 then transitions from the closed state to the open state as shown in FIG. 6, after the relays 101 and 103 have entered the open state. The ground fault current that flowed from the sub-battery 2 on the side on which the failure occurred thereby also stops, unlike the case where the failure occurs on the main battery 1 side. Both the main battery 1 and the sub-battery 2 are thereby protected from the ground fault J2.

Note that, after an overcurrent has been detected as the first current and the relays 101 and 103 have entered the open state, the relays 101 and 103 are not transitioned in the closed state even when an overcurrent is not detected for the first current. This is to ensure that the current I4 does not flow as a ground fault current again.

It is evident from the above that, if the relay 103 is excluded from consideration, the following processing will be successful, in the case where only one of a failure on the main battery 1 side (typically the abovementioned ground fault J1) and a failure on the sub-battery 2 side (typically the abovementioned ground fault J2) occurs. This is comprehensible as a method of controlling the in-vehicle power supply apparatus 100.

In a situation where both of the relays 101 and 102 are in the closed state:

(i) the relay 101 transitions from the closed state to the open state, triggered by it being detected that the first current is an overcurrent; or in other words, the relay 101 transitions from the closed state to the open state when an overcurrent flows to the relay 101; and (ii) the relay 102 transitions from the closed state to the open state, triggered by it being detected that the second current is an overcurrent after the operation (i) is executed; or in other words, the relay 102 transitions from the closed state to the open state when an overcurrent flows to the relay 102 after the relay 101 transitions from the closed state to the open state.

In the case where only the ground fault J1 occurs, the operation of (i) is executed, and the operation of (ii) is not executed. In the case where the ground fault J2 occurs, the operation of (ii) is also executed in addition to the operation of (i).

Figure 7:
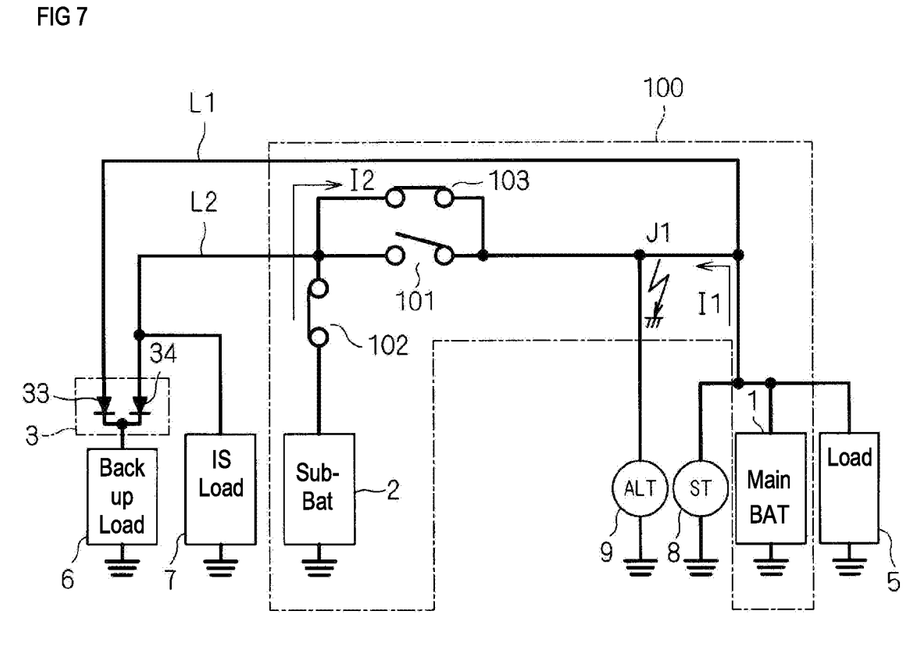
FIG. 7 is a circuit diagram showing the in-vehicle power supply apparatus according to the embodiment.

The operation to be undertaken by the relay 103 in the above operations will be examined. FIG. 7 is a circuit diagram that assumes the case where the relay 103 is in the closed state when the ground fault J1 occurs. If the relay 103 is in the closed state even when the operation of (i) is executed, the current I2 flows to ground from the sub-battery 2 via the relay 103 as a ground fault current, and power from the sub-power supply path L2 is not supplied. Therefore, in the operation of (i), the relay 103 should enter the open state following the relay 101 transitioning to the open state.

Figure 8:
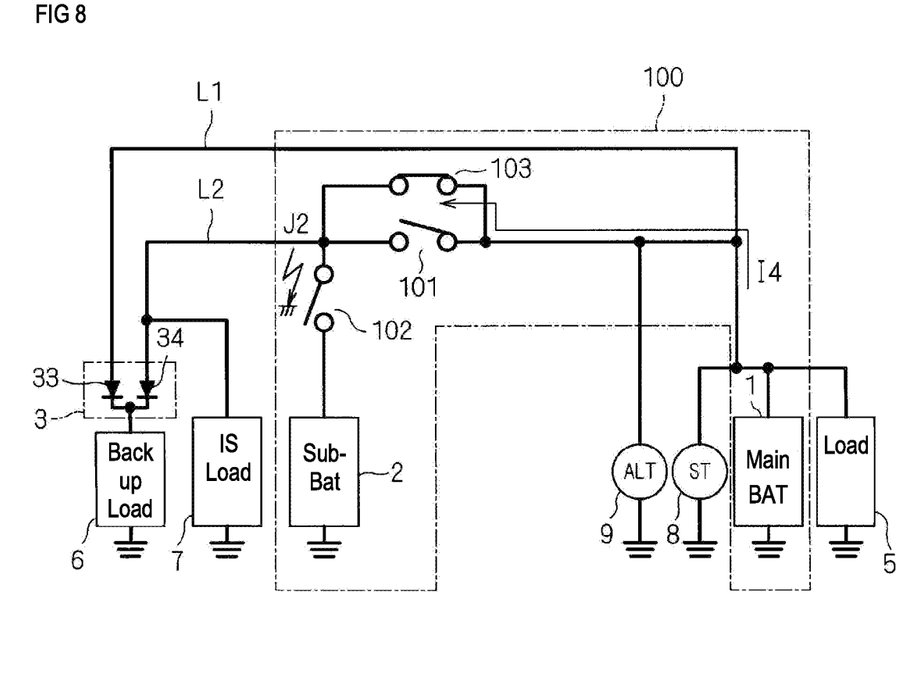
FIG. 8 is a circuit diagram showing the in-vehicle power supply apparatus according to the embodiment.

FIG. 8 is a circuit diagram that assumes the case where the relay 103 is in the closed state when the ground fault J2 occurs. If the relay 103 is in the closed state even when the operations of (i) and (ii) are executed, the current I4 flows to ground from the main battery 1 via the relay 103 as a ground fault current, and power from the main power supply path L1 is not supplied. Therefore, in the operations of (i) and (ii), the relay 103 should be in the open state.

As mentioned above, once the relays 101, 102 and 103 have entered the open state as a result of an overcurrent being detected, the relays are not transitioned to the closed state even when an overcurrent is not detected. Therefore, if the relay 103 is set to the open state in the operation of (i) by detection of an overcurrent, the relay 103 remains in the open state even in the operation of (ii). Based on the above, if the relay 103 is included in consideration, the relay 103 need only also operate similarly to the relay 101 in the processing of (i). Such operation of the relay 103 does not obstruct the ground fault current from being cut off by the relay 101 entering the open state.

The relays 101 and 103 differ, however, in desirably being respectively a normally open relay (normally off in the case where the relay 101 is comprehended as a switch) and a normally closed relay (normally on in the case where the relay 103 is comprehended as a switch). Note that the relay 102 is desirably a normally open relay. The reason for the relays 101, 102 and 103 desirably being different types of relays will be discussed below.

At the time of ignition off, the power generation function of the alternator 9 cannot be expected, and charging of the main battery 1 also cannot be expected. Therefore, it is desirable to separate the main battery 1 and the sub-battery 2, from the viewpoint of cutting off the charging path from the main battery 1 to the sub-battery 2. Therefore, a normally open relay is adopted for the relays 101, 102, and the main battery 1 and the sub-battery 2 are separated at the time of ignition off.

On the other hand, it is desirable to supply power to the idling stop load 7 even at the time of ignition off. Therefore, a normally closed relay is adopted for the relay 103, and power supply to the idling stop load 7 via the sub-power supply path L2 from the main battery 1 at the time of ignition off is secured.

Moreover, even when the normally open relays 101 and 102 are in the open state due to a malfunction or a failure of the in-vehicle ECU 403, power supply to the backup load 6 via the sub-power supply path L2 from the main battery 1 is also secured, as a result of the normally closed relay 103 being in the closed state.

Specific Operation

A specific operation for realizing the above operation principle will be described. That is, a specific technique for realizing the operations (i) and (ii) will be described.

Figure 9:
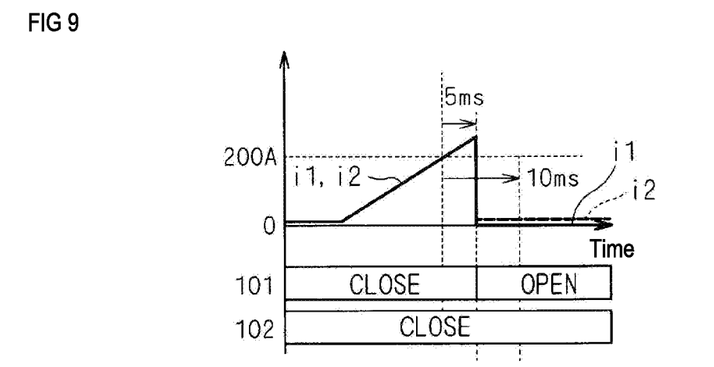
FIG. 9 is a graph showing a first technique.
Figure 10:
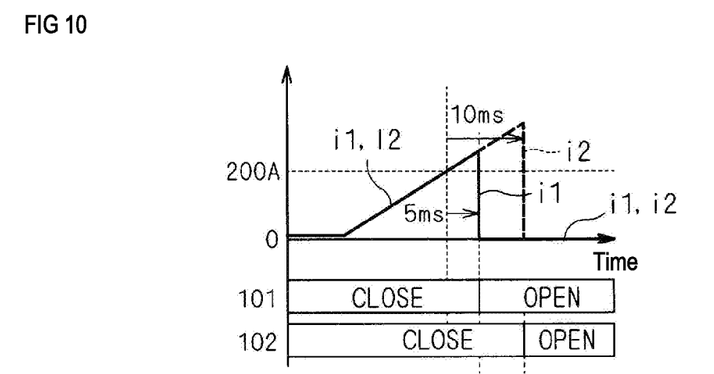
FIG. 10 is a graph showing the first technique.
Figure 11:
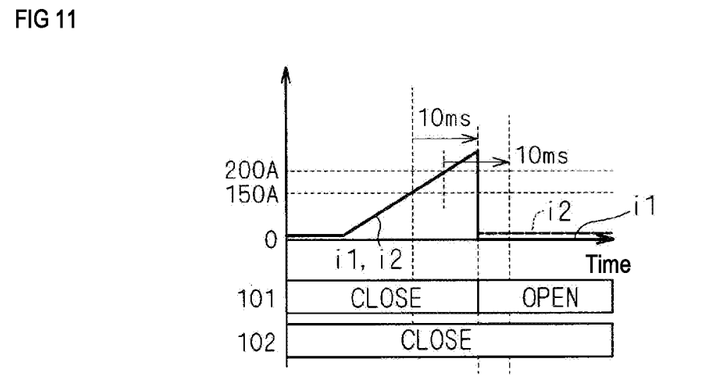
FIG. 11 is a graph showing a second technique.
Figure 12:
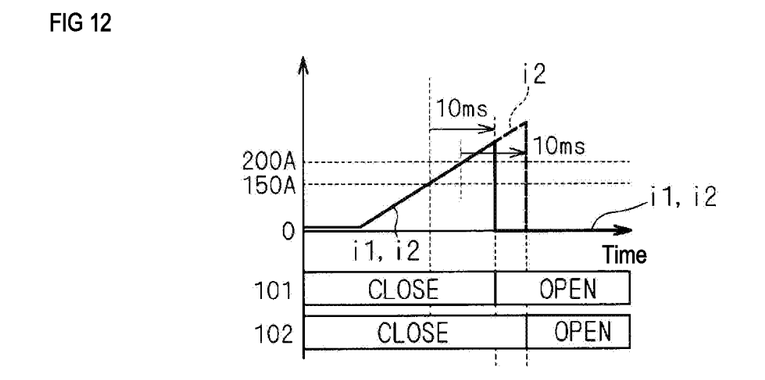
FIG. 12 is a graph showing the second technique.

FIGS. 9 and 10 are graphs showing a first technique. FIGS. 11 and 12 are graphs showing a second technique. In all of these diagrams, time is employed on the horizontal axis and a current i1 that flows to the relays 101 and 103 and a current i2 that flows to the relay 102 are employed on the vertical axis (currents i1 and i2 are absolute values whose direction of flows is not considered). Also, the relays 101 and 102 being in the open state and the closed state are respectively shown with "OPEN" and "CLOSED".

First Technique

The case where the ground fault J1 occurs will be considered using FIG. 9. In this case, both of the currents i1 and i2 are the current I2 which is a ground fault current (refer to FIG. 2), and rise. After then reaching a threshold value that is illustrated as 200 A, the currents i1 and i2 continue to exceed the threshold value for current until a first predetermined time period illustrated as 5 ms elapses, and the circuit 401 detects that overcurrent flowed to the relay 101. The in-vehicle ECU 403 thereby transitions the relay 101 from the closed state to the open state (operation (i)). The current i1 thereby becomes 0, and the current i2 flows as the current I3 (refer to FIG. 3).

The circuit 402 detects that an overcurrent flowed to the relay 102 if the current i2 exceeds the threshold value for current continuously until a second predetermined time period that is illustrated as 10 ms elapses after exceeding the threshold value for current. In the case where the ground fault J1 occurs, however, the value of the current i2 drops immediately after the first predetermined time period elapses as described above. Therefore, the operation (ii) is not performed.

The case where the ground fault J2 occurs will be considered using FIG. 10. In this case, the currents i1 and i2 are the currents I4 and I5 which are ground fault currents (refer to FIG. 4), and rise. After reaching a threshold value that is illustrated as 200 A, the current i1 then exceeds the threshold value for current continuously until a first predetermined time period that is illustrated as 5 ms elapses, and the circuit 401 detects that an overcurrent flowed to the relay 101. The in-vehicle ECU 403 thereby transitions the relay 101 from the closed state to the open state (operation (i)). The current i1 thereby becomes 0, but the current i2 continues to flow as the current I5 (refer to FIG. 3).

The circuit 402 detects that an overcurrent flowed to the relay 102, due to the current i2 exceeding the threshold value for current continuously until a second predetermined time period that is illustrated as 10 ms elapses, after exceeding the threshold value for current. The in-vehicle ECU 403 thereby transitions the relay 102 from the closed state to the open state (operation (ii)). The currents i1 and i2 both thereby become 0 (refer to FIG. 6).

The first technique is summarized as follows:

(i-1) After the time period for which a current larger than or equal to a predetermined value (200 A in the abovementioned example) flows to the relay 101 reaches a first time period (5 ms in the abovementioned example), the relay 101 transitions from the closed state to the open state; and (ii-1) After the time period for which a current larger than or equal to the abovementioned predetermined value flows to the relay 102 reaches a second time period (10 ms in the abovementioned example), the relay 102 transitions from the closed state to the open state.

It is clear that the operations (i) and (ii) are respectively executed as a result of the operations (i-1) and (ii-1). This is because the second time period is longer than the first time period, and the operation (ii-1) is executed when the relay 101 is in the open state. Naturally, the difference between the second time period and the first time period needs to be set longer than the transition time required for the relay 101 to transition from the closed state to the open state.

Second Technique

The case where the ground fault J1 occurs will be considered using FIG. 11. In this case, both of the currents i1 and i2 are the current I2 which is a ground fault current (refer to FIG. 2), and rise. After reaching a threshold value that is illustrated as 150 A, the current it exceeds the threshold value for current continuously until a first predetermined time period that is illustrated as 10 ms elapses, and the circuit 401 detects that an overcurrent flowed to the relay 101. The in-vehicle ECU 403 thereby transitions the relay 101 from the closed state to the open state (operation (i)). The current i1 thereby becomes 0, and the current i2 flows as the current I3 (refer to FIG. 3).

The circuit 402 detects that an overcurrent flowed to the relay 102, if the current i2 flows continuously at a larger current (here, a current larger than or equal to 200 A) than the threshold value for current (150 A in the abovementioned example) applied to the current i1 until a second predetermined time period that is illustrated as 10 ms elapses. In the case where the ground fault J1 occurs, however, the value of the current i2 drops immediately after the first predetermined time period elapses as described above. Therefore, the operation (ii) is not executed.

The case where the ground fault J2 occurs will be considered using FIG. 12. In this case, the currents i1 and i2 are respectively the currents I4 and I5 which are ground fault currents (refer to FIG. 4), and rise. After reaching a threshold value that is illustrated as 150 A, the current i1 then exceeds the threshold value for current continuously until a first predetermined time period that is illustrated as 10 ms elapses, and the circuit 401 detects that an overcurrent flowed to the relay 101. The in-vehicle ECU 403 thereby transitions the relay 101 from the closed state to the open state (operation (i)). The current i1 thereby becomes 0, and the current i2 continues to flow as the current I5 (refer to FIG. 5).

The circuit 402 detects that an overcurrent flowed to the relay 102, due to the current i2 having flowed continuously at a larger current (here, a current larger than or equal to 200 A) than the threshold value of the current applied to the current i1 until a second predetermined time period that is illustrated as 10 ms elapses. The in-vehicle ECU 403 thereby transitions the relay 102 from the closed state to the open state (operation (ii)). Both the currents i1 and i2 thereby become 0 (refer to FIG. 6).

The second technique is summarized as follows:

(i-2) After the time period for which a current larger than or equal to a predetermined value (150 A in the abovementioned example) flows to the relay 101 reaches a first time period (10 ms in the abovementioned example), the relay 101 transitions from the closed state to the open state; and (ii-2) After the time period for which a larger current (larger than or equal to 200 A in the abovementioned example) than the abovementioned predetermined value flows to the relay 102 reaches a second time period (10 ms in the abovementioned example), the relay 102 transitions from the closed state to the open state.

It is clear that the operations (i) and (ii) are respectively executed as a result of the operations (i-2) and (ii-2). This is because the current that flows to the relay 102 continuously increases in the case where the ground fault J2 occurs, and thus the operation (ii-2) is executed when the relay 101 is in the open state as long as the second time period is set to longer than or equal to the first time period.

Figure 13:
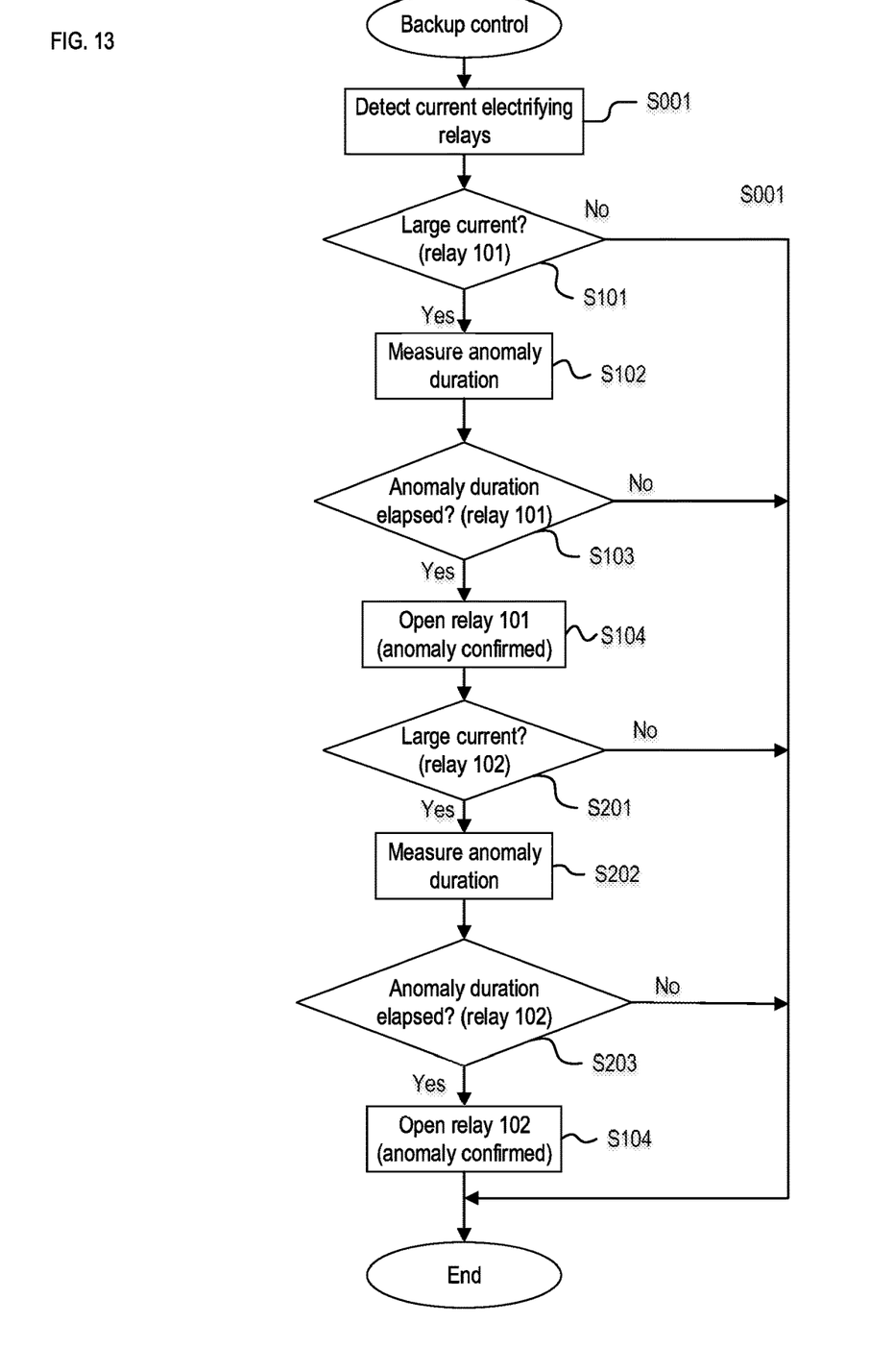
FIG. 13 is a flowchart showing the first technique and the second technique.

FIG. 13 is a flowchart showing the first technique and the second technique as backup control for securing power supply to the backup load 6. The steps shown in the flowchart are executed by the in-vehicle ECU 403, for example. The operations of the relays 101, 102 and 103 are controlled by the processing of these steps.

The group of steps S101, S102, S103 and S104 corresponds to abovementioned operations (i), (i-1) and (i-2). The group of steps S201, S202, S203 and S204 corresponds to abovementioned operations (ii), (ii-1) and (ii-2).

In step S001, currents that energize the relays 101, 102 and 103 are detected. Specifically, the values of the currents i1 and i2 respectively measured by the circuits 401 and 402 are input to the in-vehicle ECU 403. These inputs are schematically shown in FIG. 1 with the solid line arrows pointing from the circuits 401 and 402 to the in-vehicle ECU 403. Note that step S001 does not stop due to the execution of the steps that are executed thereafter. Note that step S001 continues to be executed even when executing subsequent steps S102, S201 and S202 which will be discussed later.

In step S101, it is judged whether the current that flows to the relay 101 is a large current. Specifically, it is judged whether the current i1 is larger than or equal to a threshold value for current (respectively illustrated as 200 A in the first technique and as 150 A in the second technique). If the result of the judgment is affirmative (current i1 is larger than or equal to threshold value for current), step S102 is executed. If the result of the judgment is negative (current i1 is smaller than threshold value for current), backup control ends given that an overcurrent was not detected.

In step S102, the time period for which the anomaly continues is measured. Specifically, the time period for which the current i1 continues to successively take a value greater than or equal to the abovementioned threshold value for current is measured. It is then judged in step S103 whether the anomaly duration has elapsed. Specifically, it is judged whether the current i1 flowed continuously for a predetermined time period (this was respectively illustrated as 5 ms in the first technique and as 10 ms in the second technique) at a value greater than or equal to the abovementioned threshold value for current.

If the result of the judgment is affirmative (current i1 flowed continuously for predetermined time period at value greater than or equal to abovementioned threshold value for current), step S104 is executed, and the relay 101 is set to the open state after confirming the judgment that an anomaly has occurred. This is shown schematically with the broken line arrow from the in-vehicle ECU 403 to the relay 101 in FIG. 1.

If the result of the judgment is negative (current i1 did not continuously flow for predetermined time period at value greater than or equal to abovementioned threshold value for current), backup control is ended without confirming the judgment that an anomaly has occurred.

The processing of steps S201, S202, S203 and S204 respectively corresponds to step S101, S102, S103 and S104. In step S201, it is judged whether the current that flows to the relay 102 is a large current. Specifically, it is judged whether the current i2 is larger than or equal to a threshold value for current (illustrated as 200 A in the first technique and the second technique). If the result of the judgment is affirmative (current i2 is larger than or equal to threshold value for current), step S202 is executed. If the result of the judgment is negative (current i2 is smaller than threshold value for current), backup control is ended given that an overcurrent was not detected.

In step S202, the time period for which the anomaly continued is measured. Specifically, the time period for which the current i2 continues to successively take a value greater than or equal to the abovementioned threshold value for current is measured. It is then judged in step S203 whether the anomaly duration has elapsed. Specifically, it is judged whether the current i2 flowed continuously for a predetermined time period (illustrated as 10 ms in the first technique and the second technique) at a value greater than or equal to the abovementioned threshold value for current.

If the result of the judgment is affirmative (current i2 flowed continuously for the predetermined time period at a value greater than or equal to the abovementioned threshold value for current), step S204 is executed, and the relay 102 is set to the open state after confirming the judgment that an anomaly occurred. This is shown schematically with the broken line arrow from the in-vehicle ECU 403 to the relay 102 in FIG. 1.

If the result of the judgment is negative (current i2 did not continuously flow for predetermined time period at a value greater than or equal to abovementioned threshold value for current), backup control is ended without confirming the judgment that an anomaly occurred.

Figure 14:
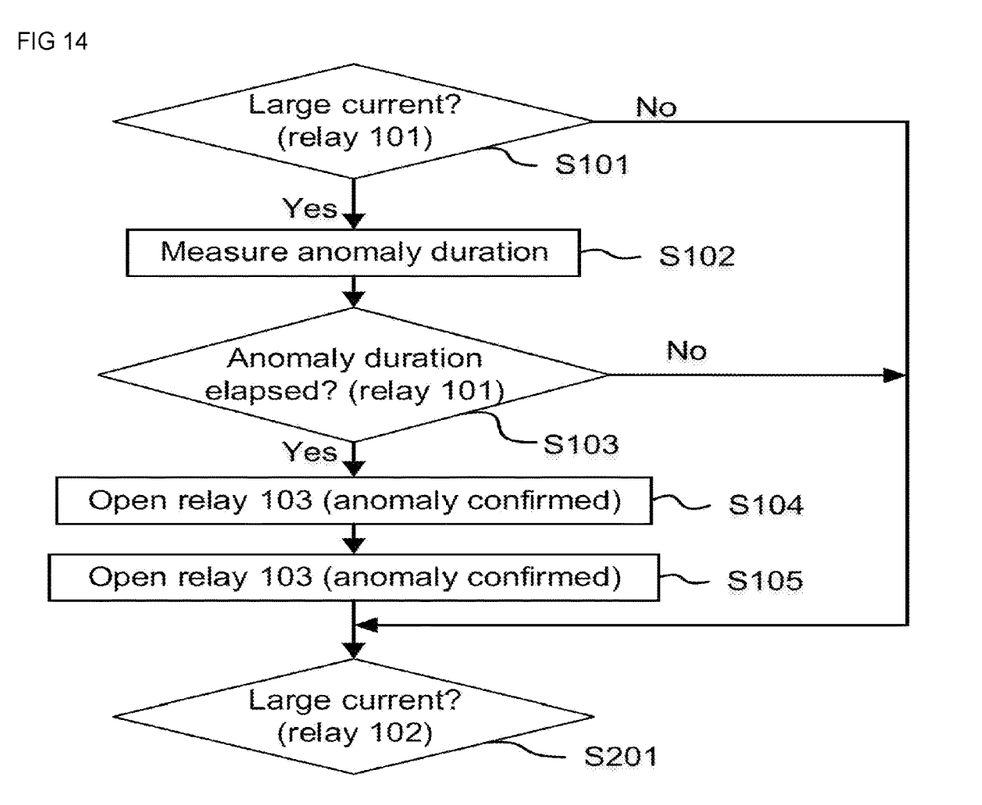
FIG. 14 is a flowchart showing a variation.

Note that the operation of the relay 103 can be included in the operation of (i), as described above. Also, the relay 102 may be set to the open state in the case where there was an anomaly in the current i2, in addition to backup control. FIG. 14 is a flowchart showing part of such a variation.

FIG. 14 shows an extraction of the portion from step S101 to step S201 in the flowchart shown in FIG. 13. The flowchart shown in FIG. 14 differs from the flowchart shown in FIG. 13 in that step S105 is inserted between step S104 and step S201, and step S201 is executed both in the case where the judgment result in step S101 is negative and in the case where the judgment result in step S103 is negative.

In step S105, the relay 103 is set to the open state (this is schematically shown with the broken line arrow from the in-vehicle ECU 403 to the relay 103 in FIG. 1). This is because the relay 103 should be in the open state in the operation of (i), as described above.

Also, it is not judged that an overcurrent flowed as the current i1, both in the case where the judgment result in step S101 is negative and in the case where the judgment result in step S103 is negative. However, even in such cases, the relay 102 can be set to the open state in the case where there is an anomaly in the current i2, as a result of the processing advancing to step S201.

The in-vehicle ECU 403 is configured to include a microcomputer and a storage device. The microcomputer executes processing steps (in other words, procedures) described in computer programs. The storage device can be constituted by one or a plurality of types of storage devices such as a ROM (Read Only Memory), a RAM (Random Access Memory), and a rewritable nonvolatile memory (EPROM (Erasable Programmable ROM), etc.), for example. The storage device stores various types of information, data and the like, stores programs that are to be executed by the microcomputer, and provides a work area for executing the programs. Note that it is comprehensible that the microcomputer functions as various means corresponding to the processing steps described in the programs, or realizes various functions corresponding to the processing steps. Also, the in-vehicle ECU 403 is not limited thereto, and the various procedures that are executed by the in-vehicle ECU 403 or the various means or various functions that are realized thereby may be partly or entirely realized with hardware.

Although the invention has been described in detail above, the foregoing description is, in all respects, illustrative, and the invention is not limited to that description. It should be understood that innumerable variations that are not illustrated herein can be conceived without departing from the scope of the invention.

FIGURES

FIGS. 1~8, 15

1 Main BAT
2 Sub-BAT
5 Load
6 Backup load
7 IS load
401, 402 Current/voltage detection

FIG. 9~12

時間 Time

FIG. 13

バックアップ制御 backup control
終了 end

S001 detect current electrifying relays
S101 large current? (relay 101)
S102 measure anomaly duration
S103 anomaly duration elapsed? (relay 101)
S104 open relay 101 (anomaly confirmed)
S201 large current? (relay 102)
S202 measure anomaly duration
S203 anomaly duration elapsed? (relay 102)
S204 open relay 102 (anomaly confirmed)

FIG. 14

S101 large current? (relay 101)
S102 measure anomaly duration
S103 anomaly duration elapsed? (relay 101)
S104 open relay 101 (anomaly confirmed)
S105 open relay 103 (anomaly confirmed)
S201 large current? (relay 102)

The invention claimed is:

1. An in-vehicle power supply apparatus comprising:
a main battery for in-vehicle use;
a first switch that transitions from on to off when an overcurrent flows thereto;
a second switch that is connected to the main battery via the first switch and transitions from on to off when an overcurrent flows thereto after the first switch transitions from on to off;
a sub-battery for in-vehicle use that is connected to the main battery via the first switch and the second switch;
a main power supply path that connects the main battery to a load, bypassing the first switch and the second switch; and
a sub-power supply path that connects the sub-battery to the load via the second switch; and
wherein the first switch transitions from on to off after a time period for which a current larger than or equal to a predetermined value continuously flows to the first switch reaches a first time period, and
the second switch transitions from on to off after the time period for which a current larger than or equal to the predetermined value continuously flows to the second switch reaches a second time period that is longer than the first time period.

2. The in-vehicle power supply apparatus according to claim 1,
the second switch transitions from on to off after a time period for which the current is larger than the predetermined value continuously flows to the second switch reaches a second time period that is longer than or equal to the first time period.

3. The in-vehicle power supply apparatus according to claim 1, further comprising:
a normally-on third switch connected in parallel to the first switch,
wherein the first switch and the second switch are normally-off switches, and
the third switch turns off following transition of the first switch from on to off.

4. A control method of an in-vehicle power supply apparatus that includes:
a main battery for in-vehicle use;
a first switch;
a second switch that is connected to the main battery via the first switch;
a sub-battery for in-vehicle use that is connected to the main battery via the first switch and the second switch;

a main power supply path that connects the main battery to a load, bypassing the first switch and the second switch; and a sub-power supply path that connects the sub-battery to the load via the second switch, the method comprising:

transitioning the first switch from on to off in a case where an overcurrent flows to the first switch, and transitioning the second switch from on to off in a case where an overcurrent flows to the second switch after the first switch has transitioned from on to off; and wherein the first switch is transitioned from on to off after a time period for which a current larger than or equal to a predetermined value continuously flows to the first switch reaches a first time period, and the second switch is transitioned from on to off after a time period for which a current larger than or equal to the predetermined value continuously flows to the second switch reaches a second time period that is longer than the first time period.

5. The control method for an in-vehicle power supply apparatus according to claim 4, the second switch is transitioned from on to off after a time period for which the current is larger than the predetermined value continuously flows to the second switch reaches a second time period that is longer than or equal to the first time period.

6. The control method for an in-vehicle power supply apparatus according to claim 4, wherein the in-vehicle power supply apparatus further includes:

a normally-on third switch connected in parallel to the first switch, the first switch and the second switch are normally-off switches, and the third switch is turned off following transition of the first switch from on to off.

7. The in-vehicle power supply apparatus according to claim 1, further comprising:

a normally-on third switch connected in parallel to the first switch, wherein the first switch and the second switch are normally-off switches, and the third switch turns off following transition of the first switch from on to off.

8. The in-vehicle power supply apparatus according to claim 2, further comprising:

a normally-on third switch connected in parallel to the first switch, wherein the first switch and the second switch are normally-off switches, and the third switch turns off following transition of the first switch from on to off.

9. The control method for an in-vehicle power supply apparatus according to claim 4, wherein the in-vehicle power supply apparatus further includes:

a normally-on third switch connected in parallel to the first switch, the first switch and the second switch are normally-off switches, and the third switch is turned off following transition of the first switch from on to off.

10. The control method for an in-vehicle power supply apparatus according to claim 5, wherein the in-vehicle power supply apparatus further includes:

a normally-on third switch connected in parallel to the first switch, the first switch and the second switch are normally-off switches, and the third switch is turned off following transition of the first switch from on to off.

* * * * *